(12) United States Patent
Kuwata et al.

(10) Patent No.: US 11,474,031 B2
(45) Date of Patent: Oct. 18, 2022

(54) GAS DETECTION APPARATUS

(71) Applicant: Asahi Kasei Microdevices Corporation, Tokyo (JP)

(72) Inventors: Keiichiro Kuwata, Tokyo (JP); Shota Isshiki, Tokyo (JP); Yuji Ikeda, Kyoto (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/193,098

(22) Filed: Mar. 5, 2021

(65) Prior Publication Data

US 2021/0285871 A1     Sep. 16, 2021

(30) Foreign Application Priority Data

Mar. 16, 2020   (JP) .............................. JP2020-045669
Mar. 1, 2021    (JP) .............................. JP2021-032049

(51) Int. Cl.
*G01N 21/3504*  (2014.01)
*G02B 5/10*     (2006.01)

(52) U.S. Cl.
CPC ........... *G01N 21/3504* (2013.01); *G02B 5/10* (2013.01); *G01N 2201/0636* (2013.01)

(58) Field of Classification Search
None
See application file for complete search history.

(56) References Cited

U.S. PATENT DOCUMENTS

| | | | |
|---|---|---|---|
| 2007/0221848 A1* | 9/2007 | Johnson | G01J 5/10 |
| | | | 250/339.02 |
| 2009/0235720 A1* | 9/2009 | Smith | G01N 21/3504 |
| | | | 73/31.05 |
| 2015/0377775 A1 | 12/2015 | Sakai et al. | |

FOREIGN PATENT DOCUMENTS

| | | |
|---|---|---|
| JP | 2015184211 A | 10/2015 |
| WO | 2014136414 A1 | 9/2014 |

* cited by examiner

*Primary Examiner* — Edwin C Gunberg
(74) *Attorney, Agent, or Firm* — Kenja IP Law PC

(57) ABSTRACT

A stable and highly accurate gas detections apparatus is provided. A gas detection apparatus 1 includes a light emitting element 3 provided on a main surface 20 of the substrate 2 for emitting light from a light emitting surface 31; a light receiving element 4 provided on the main surface 20 of the substrate 2 for receiving the light on a light receiving surface 41; and a light guide member 5 for guiding the light emitted by the light emitting element 3 to the light receiving element 4. In plan view of the main surface of the substrate, the light emitting surface 31 and the light receiving surface 41 are shaped to have corners, and side of the light emitting surface 31 after being subjected to a magnification or reduction and a translation do not overlap sides of the light receiving surface 41.

12 Claims, 10 Drawing Sheets

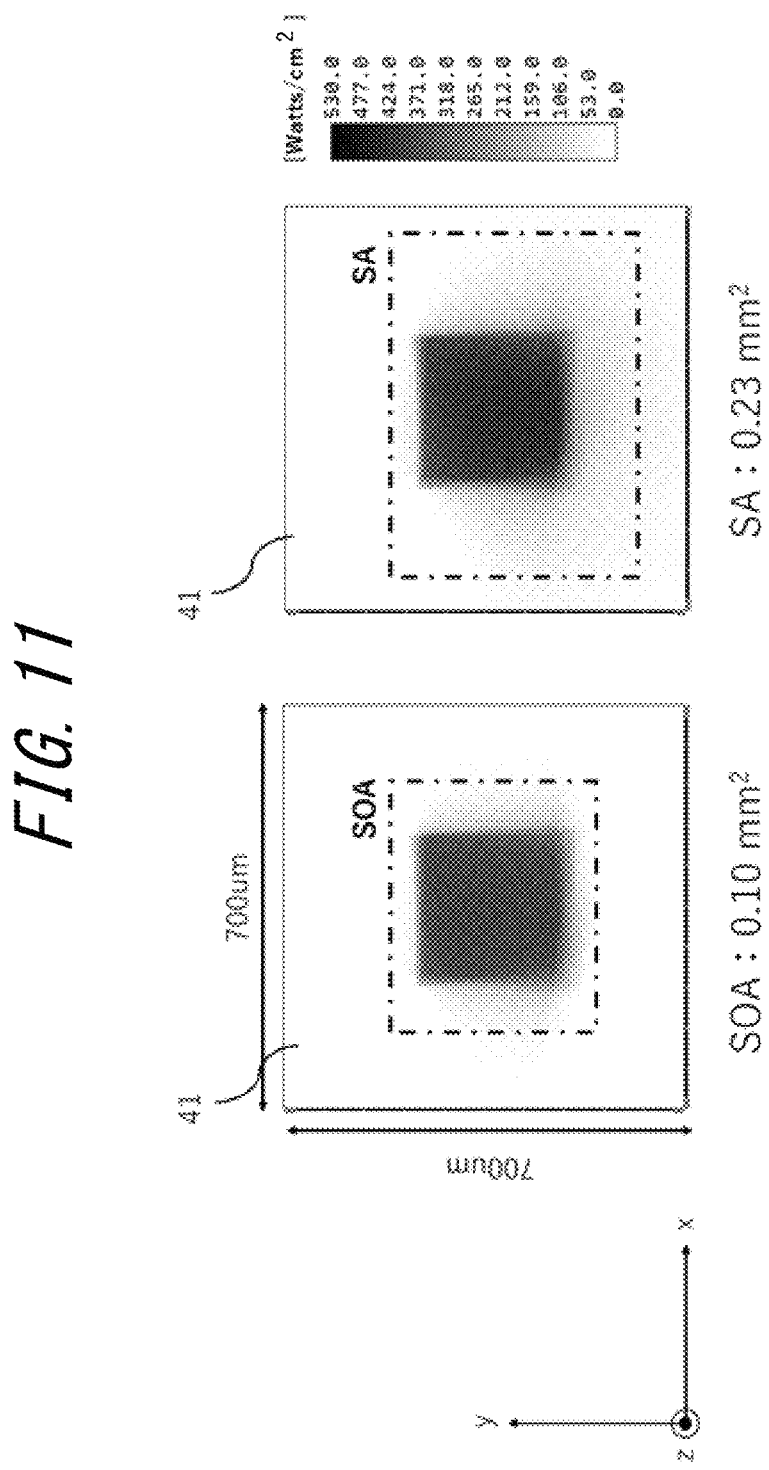

GAS DETECTION APPARATUS

CROSS-REFERENCE TO RELATED APPLICATION

The present application claims priority to and the benefit of Japanese Patent Application No. 2020-045669 filed Mar. 16, 2020 and Japanese Patent Application No. 2021-32049 filed Mar. 1, 2021, the entire contents of which are incorporated herein by reference.

TECHNICAL FIELD

The present disclosure relates to a gas detection apparatus.

BACKGROUND

Gas detection apparatuses for detecting gases have been used in various fields. For example, PTL 1 discloses an apparatus including a light source for emitting infrared light and a detector for detecting infrared light in a certain wavelength, accommodated in the same case. A gas to be detected is introduced to the case.

CITATION LIST

Patent Literature

PTL 1: JP 2015-184211 A

SUMMARY

Here, the gas detection apparatus described in PTL 1 reflects light multiple times by a plurality of mirrors to lengthen the optical path. In this case, when a plurality of optical members are disposed in the optical system, an image of light received by a light receiving element may be altered from the original image due to a conversion, such as a magnification, reduction, or rotation, of the image of light emitted by a light emitting element, or influences of optical aberration and diffraction. Such alternations of the image of light may interfere with stable and highly accurate gas detections.

In the meantime, lamps have been used as light sources in gas detection apparatuses. In recent years (since 2018), however, surface mount device (SMD) type medium-infrared LED light sources have been developed and been in mass production, and light sources having significantly smaller light emitting elements than lamps have been used. In conventional lamps, the size of light incident on a light receiving element (cross-sectional area of an incident light flux) is sufficiently larger than the size of a light receiving element, and the cross-section of the incident light flux extends so as to form a rotationally symmetrical shape (typically forming a circular shape). In an LED light source, on the other hand, the cross-sectional area of an incident light flux is equal to or smaller than the size of a light receiving element. Because the shape of the light source is rectangular, the cross-section of the incident light flux has also a rectangular shape having corners. In this case, the corners of the cross-section of the incident light flux may be out of the light receiving element, which results in a reduced signal to noise ratio (SNR) of the light receiving element.

It would be thus helpful to provide a solution to the above-mentioned convention issue by providing stable and highly accurate gas detection apparatuses.

A gas detection apparatus according to an embodiment of the present disclosure comprises:
a light emitting element provided on a main surface of the substrate for emitting light from a light emitting surface;
a light receiving element provided on the main surface of the substrate for receiving the light on a light receiving surface; and
a light guide member for guiding the light emitted by the light emitting element to the light receiving element,
in plan view of the main surface of the substrate,
the light emitting surface and the light receiving surface being shaped to have corners, and
side of the light emitting surface after being subjected to a magnification or reduction and a translation not overlapping sides of the light receiving surface.

As used herein, the term "light emitting surface" refers to a surface which is in contact with the gas at a light emitting portion of an element and is made of an optically transparent material. The term "light receiving surface" refers to a surface which is in contact with the gas at a light sensitive portion of the element and is made from an optically transparent material.

A gas detection apparatus according to an embodiment of the present disclosure comprises:
a light emitting element provided on a main surface of the substrate for emitting light from a light emitting surface;
a light receiving element provided on the main surface of the substrate for receiving the light on a light receiving surface; and
a light guide member for guiding the light emitted by the light emitting element to the light receiving element,
in plan view of the main surface of the substrate,
the light emitting surface and the light receiving surface being shaped to have corners, and
sides of the light emitting surface being parallel to neither sides of the light receiving surface.

A gas detection apparatus according to an embodiment of the present disclosure comprises:
a substrate having a rectangular main surface;
a light emitting element provided on a main surface of the substrate for emitting light from a rectangular light emitting surface;
a light receiving element provided on the main surface of the substrate for receiving the light on a rectangular light receiving surface; and
a light guide member for guiding the light emitted by the light emitting element to the light receiving element,
sides of the light receiving surface or the light emitting surface being parallel to neither sides of the main surface of the substrate in the plan view of the main surface of the substrate.

According to one embodiment of the present disclosure, stable and highly accurate gas detections apparatuses can be provided.

BRIEF DESCRIPTION OF THE DRAWINGS

In the accompanying drawings:

FIG. 11 is a diagram for explaining suppression of the influence of optical aberration when an off-axis optical system is used.

DETAILED DESCRIPTION

Figure 1:
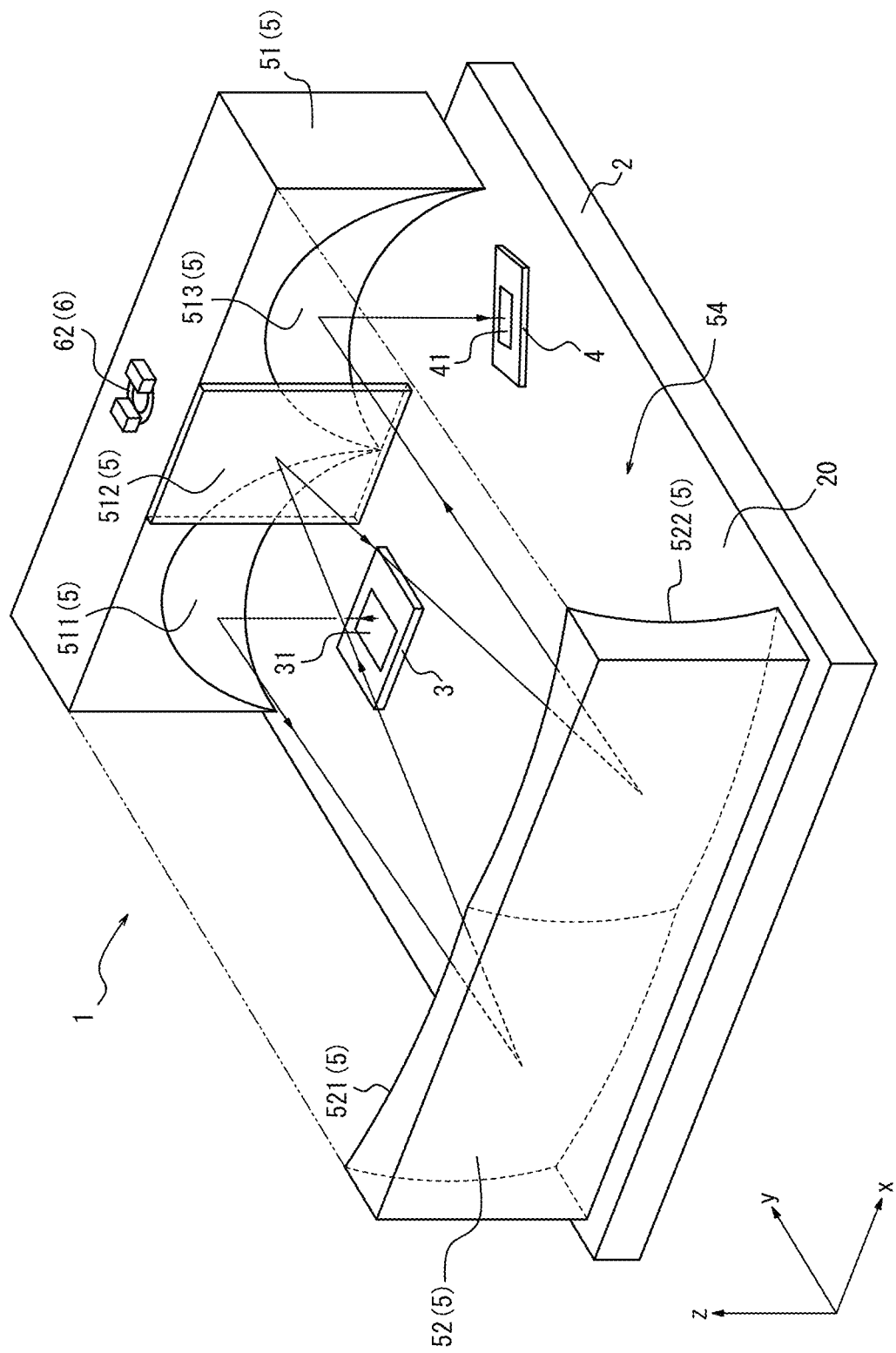
FIG. 1 is a perspective view illustrating a gas detection apparatus according to an embodiment of the present disclosure, a part of which is made transparent.

FIG. 1 is a perspective view illustrating a gas detection apparatus 1 according to an embodiment of the present disclosure, a part of which is made transparent. In one example, the gas detection apparatus 1 is a small-sized apparatus with dimensions of 30 mm×20 mm×10 mm, and is also referred to as a "gas sensor". In the present embodiment, the gas detection apparatus 1 is an apparatus employing the non-dispersive infrared (NDIR) spectroscopy for measuring the density of a gas to be detected based on infrared light which has transmitted through the introduced gas. Examples of the gas to be detected include carbon dioxide, water vapor, methane, propane, formaldehyde, carbon monoxide, nitric oxide, ammonium, sulfur dioxide, and alcohol.

The gas detection apparatus 1 includes a substrate 2, a light emitting element 3, a light receiving element 4, a light guide member 5, and a joint member 6. FIG. 1 illustrates an example configuration of the gas detection apparatus 1 in which a part of the light guide member 5 is made transparent so that the light emitting element 3 and the light receiving element 4 provided on the main surface 20 of the substrate 2 are visible. In the present embodiment, the main surface 20 is the surface facing the light guide member 5 among the largest surfaces of the substrate 2. The main surface 20 is rectangular.

Hereinafter, as illustrated in FIG. 1, the rectangular coordinate system is defined so that xy-planes are parallel to the main surface 20 of the substrate 2. The z-axis direction is the direction orthogonal to the main surface 20 of the substrate 2. The x- and y-axis directions are parallel to the sides of the main surface 20 of the substrate 2. Here, the y-axis direction corresponds to the direction along which a first reflecting portion 51 and a second reflecting portion 52 to be described later face to each other.

The substrate 2 is a plate-shaped member on which components of the gas detection apparatus 1 are amounted, providing electrical connections between the mounted electronic components. The light emitting element 3 and the light receiving element 4 are disposed on the main surface 20 of the substrate 2. Other electronic components may also be mounted on the substrate 2. For example, a controller for controlling at least one of the light emitting element 3 and the light receiving element 4 may be disposed on the main surface 20 or the bottom surface opposite to the main surface 20 of the substrate 2. Additionally, a computation unit for carrying out computations for calculating the gas density may also be provided on the main surface 20 or the bottom surface of the substrate 2. The computation unit may include at least one of a general-purpose processor that performs functions according to a program that is read, and a dedicated processor specialized for particular processing. The dedicated processor may include an application specific integrated circuit (ASIC). The processor may include a programmable logic device (PLD). The computation unit may be integrated with the controller described above.

The light emitting element 3 is a component for emitting light used for detection of the gas to be detected. The light emitting element 3 is not particularly limited as long as it outputs light including light components in wavelengths absorbable by the gas to be detected. In the present embodiment, the light emitted by the light emitting element 3 is, but not limited to, infrared light. The light emitting element 3 is a light emitting diode (LED) in the present embodiment. In another example, the light emitting element 3 may be an incoherent light source, such as an organic light emitting element and a micro electro mechanical systems (MEMS) heater. The light-emitting element 3 is provided at a position facing the first mirror 511, to be described later, in the z-axis direction.

The light emitting element 3 includes a rectangular light emitting surface 31. The light emitting element 3 is a surface light source that emits light from the entire light emitting surface 31. As illustrated in FIG. 1, the light emitting element 3 emits light from the light emitting surface 31 toward the z-axis direction, i.e., the thickness direction of the substrate 2.

The light receiving element 4 is a component for receiving light which has transmitted through the introduced gas. The light receiving element 4 is not particularly limited as long as it has sensitivity to light in bandwidths including wavelengths absorbable by the gas to be detected. In the present embodiment, the light receiving element 4 receives, but is not limited to, infrared light. The light receiving element 4 is a photodiode in the present embodiment. In another example, the light receiving element 4 may be a phototransistor or a thermopile, a pyroelectric sensor, a bolometer, or the like. The light receiving element 4 converts the received light into an electrical signal, and outputs the converted electrical signal. The electric signal is output to, for example, the computation unit. The computation unit receives the electrical signal, and calculates the density of the gas to be detected based on a property such as the transmittance of the light. The z-axis directional position of the light receiving element 4 is set so that the light receiving element 4 faces a fifth mirror 513 to be described later. The light receiving element 4 may include an optical filter having a wavelength selection function.

The light receiving element 4 includes a rectangular light receiving surface 41. As illustrated in FIG. 1, the light receiving element 4 receives light in the z-axis direction, i.e., the thickness direction of the substrate 2, on the light receiving surface 41.

The light guide member 5 is a member for guiding the light emitted by the light emitting element 3 to the light receiving element 4. The light guide member 5 is an optical system of the gas detection apparatus 1. The light guide member 5 includes optical members to configure an optical path from the light emitting element 3 to the light receiving element 4. In other words, the light guide member 5 optically couples the light emitting element 3 and the light receiving element 4. Here, the optical members are a mirror and a lens, for example.

In the present embodiment, the light guide member 5 includes a first reflecting portion 51 and a second reflecting portion 52. The first reflecting portion 51 includes a first mirror 511, a third mirror 512, and a fifth mirror 513 as optical members. The first reflecting portion 51 directly reflects light emitted from the light emitting element 3 and light to be received by the light receiving element 4. The second reflecting portion 52 includes a second mirror 521 and a fourth mirror 522 as optical members. The second reflecting portion 52 reflects light to and from the first reflecting portion 51. The light guide member 5 reflects the light emitted by the light emitting element 3 multiple times and transmits the light to the light receiving element 4. Specifically, the light guide member 5 reflects light emitted by the light emitting element 3 with the first mirror 511, the second mirror 521, the third mirror 512, the fourth mirror 522, and the fifth mirror 513, in this order, to guide the light to the light receiving element 4. A cell 54 is provided between the light guide member 5 and the substrate 2, and the optical path is configured to pass through the cell 54 to which the gas is introduced. In another example, the number of the mirrors provided in the light guide member 5 may not be five but may be any number equal to or greater than one. Further, the light guide member 5 may be configured to include a lens in a part of the optical path.

In the light guide member 5, the relative position of the first reflecting portion 51 to the second reflecting portion 52 is fixed. For example, the first reflecting portion 51 and the second reflecting portion 52 may b e molded monolithically from a resin. The mirrors of the first reflecting portion 51 and the second reflecting portion 52 may be formed by metal plating subsequent to the monolithic molding. In another example, the first reflecting portion 51 and the second reflective portion 52 may be formed as separate entities and securely fixed to each other by an adhesive, screws, nails, mating, grommets, welding, or the like.

The first mirror 511 is a converging mirror that reflects light that is incident from the focal point. The first mirror 511 is, for example, a concave mirror. The first mirror 511 may be shaped to have an elliptic surface. In this embodiment, the first mirror 511 reflects light emitted in the z-axis direction from the light emitting element 3 located at the focal point, toward the xy-plane direction orthogonal to the z-axis direction. As used herein, the term "xy-plane direction" refers to a direction having at least one of x- and y-axis directional components. However, the xy-plane direction may include a z-axis directional component.

The second mirror 521, the third mirror 512, and the fourth mirror 522 reflect respective light that is incident thereon. At least one of the second mirror 521, the third mirror 512, and the fourth mirror 522 may be a converging mirror having a light converging function. At least one of the second mirror 521, the third mirror 512, and the fourth mirror 522 may be, for example, a concave mirror. As illustrated in FIG. 1, the second mirror 521 reflects light that is incident from the first mirror 511, to the third mirror 512. The third mirror 512 reflects light that is incident from the second mirror 521, to the fourth mirror 522. The fourth mirror 522 reflects light that is incident from the third mirror 512, to the fifth mirror 513.

The fifth mirror 513 is a converging mirror for converging incident light on the focal point. The fifth mirror 513 is, for example, a concave mirror. The fifth mirror 513 may be shaped to have an elliptic surface. In this embodiment, the fifth mirror 513 reflects incident light in the xy-plane direction from the fourth mirror 522 so that the reflected light has a component in the z-axis direction. Specifically, the fifth mirror 513 reflects incident light so that the light is condensed on the light receiving element 4 located at a focal point.

Examples of the material composing the first mirror 511, the second mirror 521, the third mirror 512, the fourth mirror 522, and the fifth mirror 513 may include, but are not limited to, metals, glass, ceramics, and stainless steels, for example. From the viewpoint of improving the detection sensitivity, these mirrors are preferably made of a material having a low light absorption coefficient and a high reflectance. Specifically, resin housings provided with coating of an alloy containing aluminum, gold, or silver, a dielectric, or a laminate of these materials are preferred. Resin housings coated with gold or an alloy layer containing gold are preferred in view of the reliability and degradation over time. Further, a laminated film of a dielectric is preferably formed on the surface of the metal layer for increasing the reflectance. Formation of the first mirror 511 and the fifth mirror 513 by vapor deposition or plating to the resin casing can achieve a higher productivity and provide improved lightweightness as compared with cases where they are made from a metal material. Further, the thermal expansion coefficient difference with the substrate 2 is reduced, which suppresses thermal deformations to thereby make the sensitivity resistant to fluctuations. Alternatively, the light guide member 5 may be formed by machining, and is more preferably formed by injection molding in view of the productivity.

The joint member 6 is a member joining the substrate 2 and the light guide member 5. In the present embodiment, the joint member 6 includes a first bottom portion 61 joining to the substrate 2 and a second bottom portion 62 joining to the light guide member 5 (see FIG. 2). The first bottom portion 61 and the substrate 2 are joined by, for example, an adhesive, a grommet or screw, welding, a nail, mating, or the like. The second bottom portion 62 and the light guide member 5 are joined in the similar manner. In addition, in view of the productivity, the joint member 6 and the light guide member 5 are preferably molded monolithically in view of reduction of the number of components.

Figure 2:
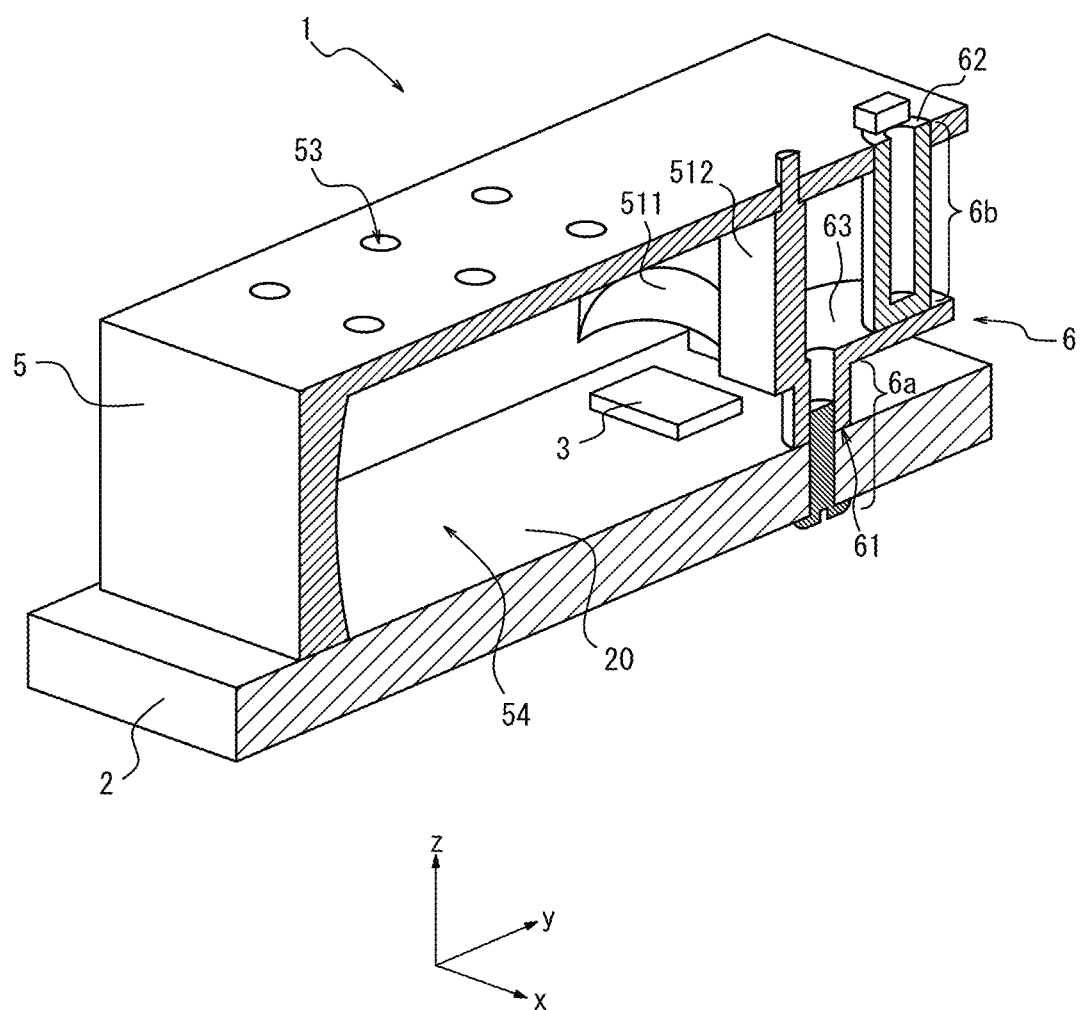
FIG. 2 is a diagram illustrating an example of a cross-section of the gas detection apparatus.

FIG. 2 is a diagram illustrating an example cross-section of the gas detection apparatus 1. FIG. 2 depicts a cross-section where the substrate 2, the light guide member 5 including the third mirror 512, and the joint member 6 are cut along a plane parallel to yz-planes. The cell 54 is defined by the interior of the gas detection apparatus 1 sandwiched between the substrate 2 and the light guide member 5. The light guide member 5 includes vents 53 for introducing a gas into the cell 54. The vents 53 may also be used for discharging the gas from the cell 54.

The joint member 6 includes a first portion 6a including a first bottom portion 61, a second portion 6b including a second bottom portion 62, and a coupling portion 63 which couples the first portion 6a, the second portion 6b, and the third mirror 512. The first portion 6a and the second portion 6b include respective hollow columnar bodies. The first bottom portion 61 is joined to the substrate 2 by threading a screw from the bottom surface of the substrate 2. The second bottom portion 62 is joined to the light guide member 5 by a grommet that extends in the hollow portion after being inserted into the hollow portion. As illustrated in FIG. 2, the third mirror 512 is coupled to the joint member 6. As a result, the relative position of the first reflecting portion 51 to the second reflecting portion 52 is fixed further securely. In another example, the first portion 6a and the second portion 6b may be solid columnar bodies. The first bottom portion 61 and the substrate 2, and the second bottom portion 62 and the light guide member 5 may be joined to each other by an adhesive, screws, nails, mating, grommets, welding, or the like. The first mirror 511, the main surface 20 of the substrate 2, and the light emitting element 3 in FIG. 2 are the same as the corresponding elements denoted by the same reference symbols in FIG. 1, and a description thereof will thus be omitted.

Figure 3:
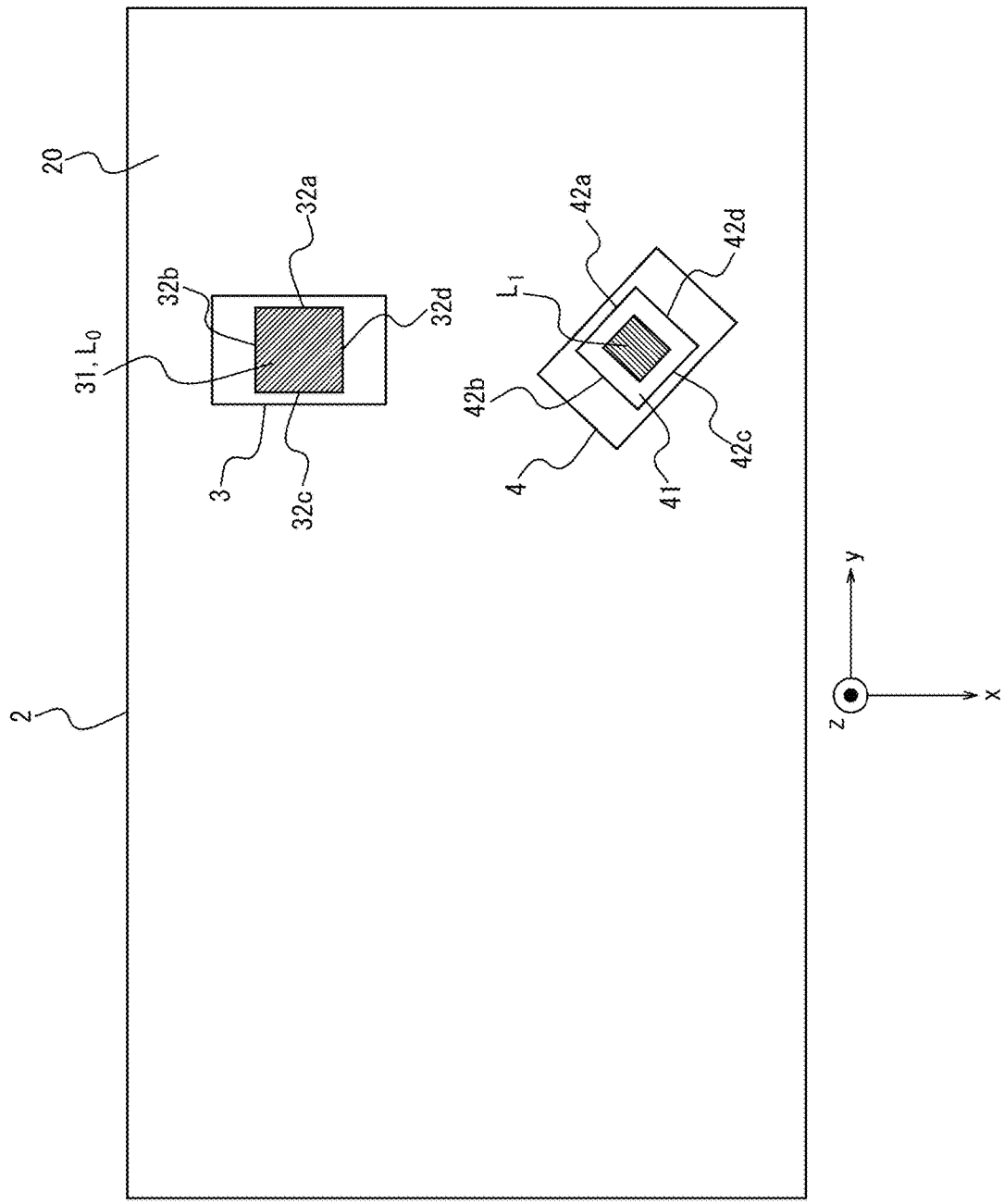
FIG. 3 is a diagram illustrating an example of the dispositions of a light emitting element and a light receiving element.

FIG. 3 is a diagram illustrating an example of the dispositions of the light emitting element 3 and the light receiving element 4. In FIG. 3, the main surface 20 of the substrate 2 viewed toward the z-axis negative direction is illustrated. In other words, the dispositions of the light emitting element 3 and the light receiving element 4 are illustrated in plan view of the main surface 20 of the substrate 2.

As illustrated in FIG. 3, the light emitting surface 31 is a rectangular, and has sides 32a, 32b, 32c, and 32d. Further, the light receiving surface 41 is a rectangular, and has sides 42a, 42b, 42c, and 42d. The light emitting surface 31 and the light receiving surface 41 are shaped to have corners. Generally, the expression "S being shaped to have corners" means that the shape S can be approximated by a polygon having six or less sides, and that, when a polygon P having N vertices (N is an integer of greater than 2 and less than 7) is defined on the shape S so that the non-conformity area ratio is minimized, the non-conformity area ratio is 5% or less. As used herein, the "non-conformity area ratio" is defined as the value obtained by dividing the sum of the areas of regions included in the shape S but not included in the polygon P and areas of regions not included in the shape S but included in the polygon P, by the area of the shape S. For comparison, the minimum non-conformity area ratio of a regular hexagon to a circle is 7.4%, and accordingly the circle is not a shape having corners.

The light emitting element 3 emits light from the entire surface of the light emitting surface 31. The shape of emitted light $L_0$ when the main surface 20 of the substrate 2 is viewed in plan matches the shape of the light emitting surface 31. The sides 32a, 32b, 32c, and 32d of the light emitting surface 31 are parallel to the x-axis or the y-axis. In other words, in plan view of the main surface 20 of the substrate 2, the sides 32a, 32b, 32c, and 32d of the light emitting surface 31 are parallel to either side of the main surface 20 of the substrate 2.

The light receiving element 4 receives rectangular incident light $L_1$ on the light receiving surface 41. The incident light $L_1$ has a shape of the emitted light $L_0$ after being subjected to a transformation, such as a reduction followed by a rotation, a shear transformation, and a trapezoidal distortion, in the xy-plane. For reason to be described later, the light receiving surface 41 is disposed in accordance with a rotation of the incident light $L_1$ so that the minimum distance between the edges of the incident light $L_1$ and the sides 42a, 42b, 42c, and 42d of the light receiving surface 41 is increased. As illustrated in FIG. 3, the sides 42a, 42b, 42c, and 42d of the light receiving surface 41 are parallel to neither the x-axis nor the y-axis. In other words, in plan view of the main surface 20 of the substrate 2, the sides 42a, 42b, 42c, and 42d of the light receiving surface 41 are parallel to neither sides of the main surface 20 of the substrate 2.

Here, in the gas detection apparatus 1 where light is reflected multiple times in the optical system, the image of light is generally rotated except for a certain disposition. In an example, the rotation angle is not zero and is 45° or less, for example. Hence, in plan view of the main surface 20 of the substrate 2, the orientations of the sides of the incoming light $L_1$ do not match the orientations of the sides of the non-transformed emitted light $L_0$, but match the orientations of the emitted light $L_0$ after being subjected to a rotational displacement.

Figure 4:
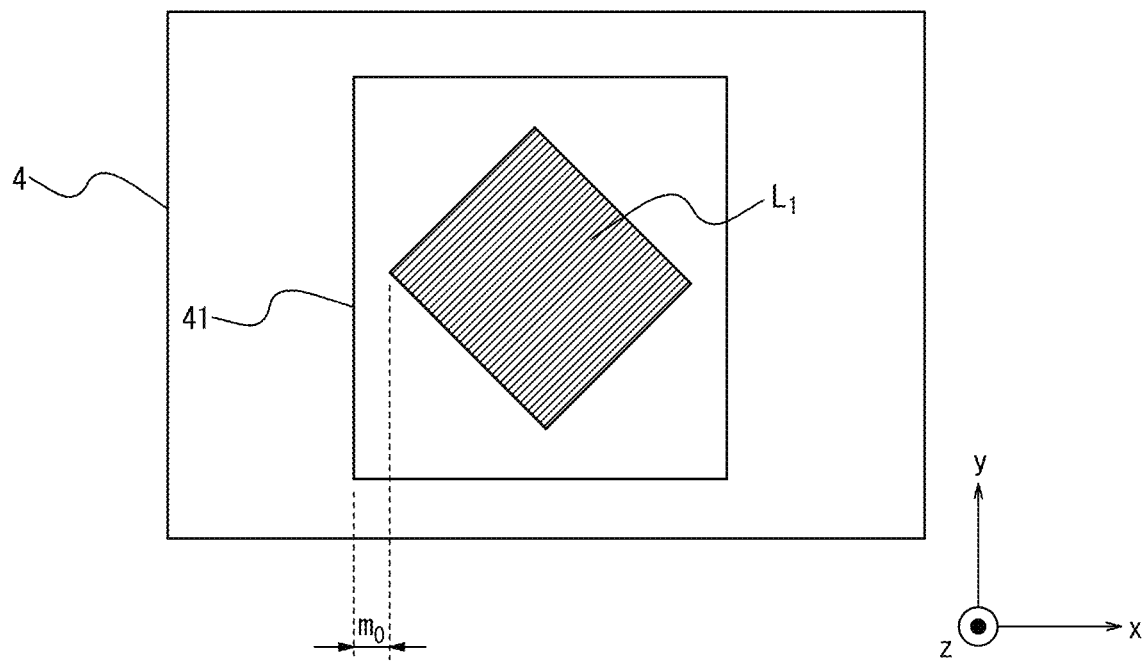
FIG. 4 is a diagram illustrating margins of a light receiving element in a comparative example.

FIG. 4 is a diagram illustrating an example disposition of the light receiving element 4 in a comparative example. The light receiving element 4 in the comparative example is disposed so that the sides of the light receiving surface 41 are parallel to the x-axis or the y-axis. In other words, in the comparative example, the light receiving element 4 is disposed so that the sides of the light receiving surface 41 are parallel to the sides of the main surface 20 of the substrate 2. Because the incident light $L_1$ is rotated as described above, the minimum margin $m_0$ of the light receiving region in the light receiving surface 41 of the light receiving element 4 is narrow in the comparative example. When the margin $m_0$ is narrow, the total amount of light receivable by the light receiving surface 41 may be altered by an error of disposition of the light receiving element 4 on the main surface 20, displacement of the incident light $L_1$ caused by the use environment or aging, or the like, and the accuracy of the gas detection may be affected. It might be possible to widen the margin $m_0$ by increasing the size of the light receiving surface 41, i.e., the light receiving element 4. In this case, however, the manufacturing cost and noises of the gas detection apparatus 1 would increase and miniaturization would be difficult. Other factors that narrow the margin $m_0$ include the effects of optical aberration and diffraction.

Figure 5:
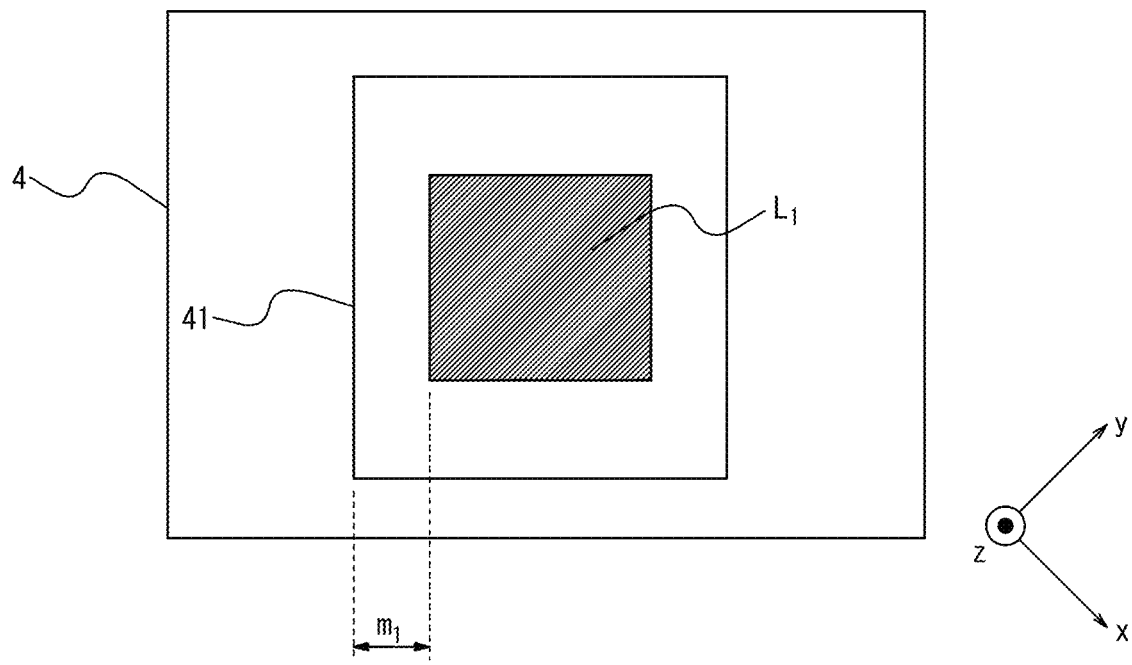
FIG. 5 is a diagram illustrating margins of the light receiving element in the present embodiment.

FIG. 5 is a diagram illustrating an example disposition of the light receiving element 4 of the gas detection apparatus 1 according to the present embodiment. As described above, in the present embodiment, the light receiving surface 41 is disposed so as to be rotated in accordance with incident light $L_1$ in the xy-plane. This contributes to widen the minimum margin $m_1$ of the light receiving region as compared to the margin $m_0$ in the comparative example. Because the gas detection apparatus 1 according to the present embodiment has a larger margin $m_1$, the accuracy of gas detections is less susceptible to an error of disposition of the light receiving element 4 on the main surface 20, displacement of incident light $L_1$ caused by the use environment or aging, or the like. The gas detection apparatus 1 according to the present embodiment is therefore capable of achieving stable and highly accurate gas detections.

Figure 9:
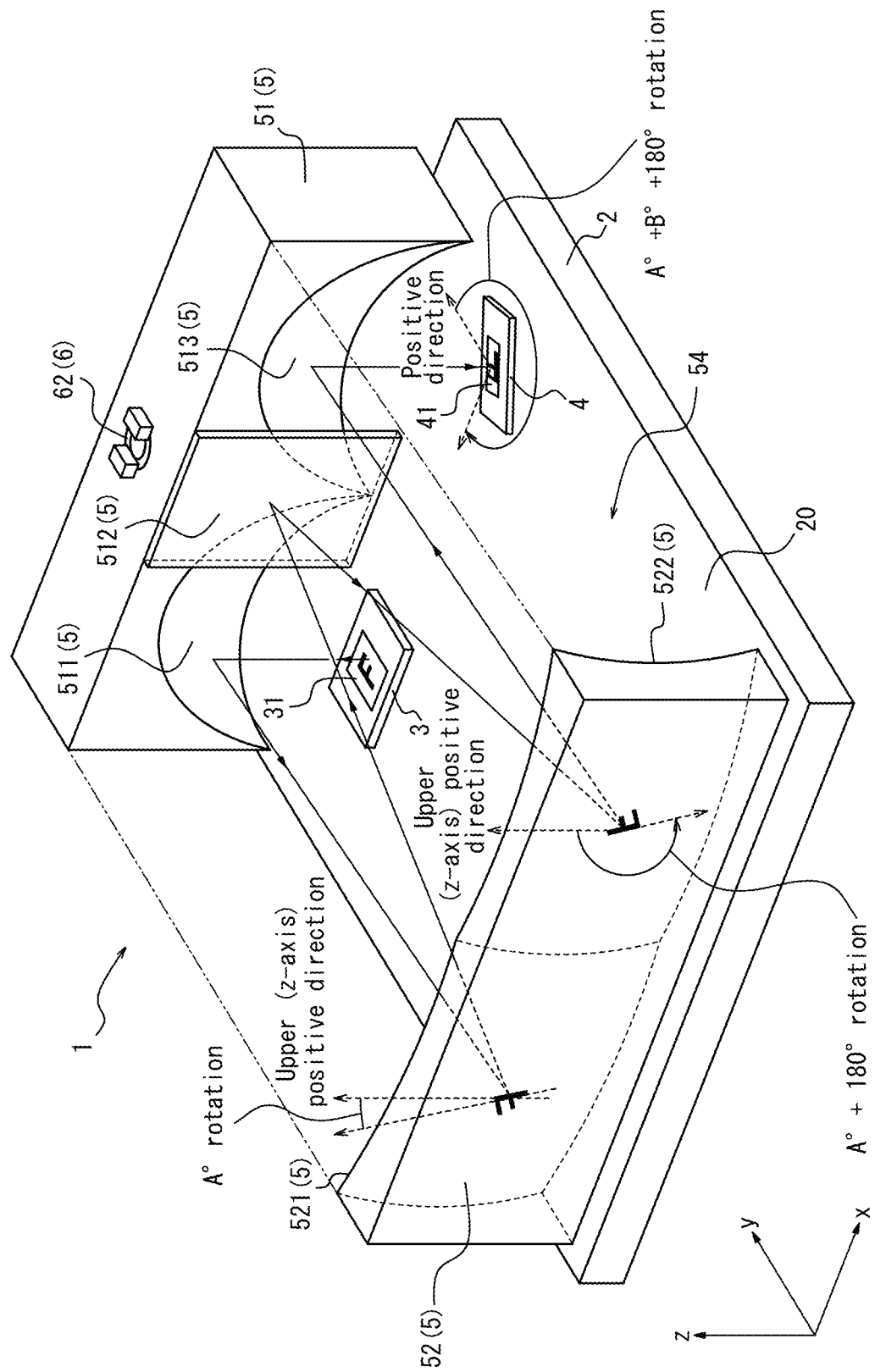
FIG. 9 is a diagram for explaining the cause of a rotation of an image of light.
Figure 10:
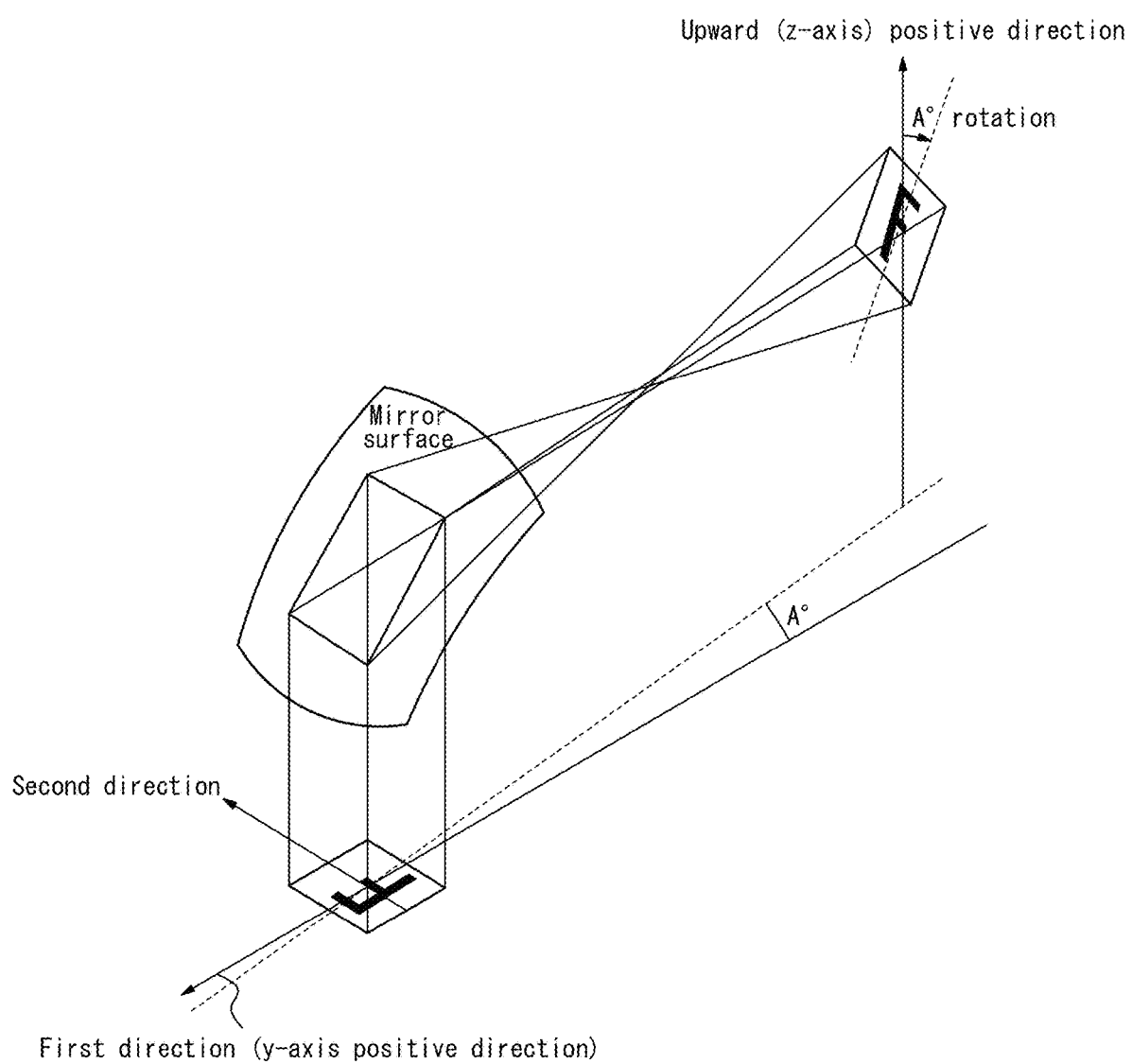
FIG. 10 is a diagram for explaining the cause of rotations of the image of light.

Here, the cause of a rotation of the image of light (incident light $L_1$) will be described. As an example, referring to FIGS. 9 and 10, an example in which, among the second mirror 521, the third mirror 512, and the fourth mirror 522, the third mirror 512 is a converging mirror having a light converging function will be described. The rotation of the image is determined by the orientations of the inclinations of the first mirror 511 and the fifth mirror 513. Light emitted from the light emitting surface 31 is reflected by the first mirror 511 toward the direction of the second mirror 521. At this time, the light emitted from the focal point of the first mirror 511 is focused onto the second mirror 521 located at the other focal point of the ellipse. Further, the long side of the ellipse of the first mirror 511 is inclined at a slope A relative to one side of the rectangular light emitting surface 31 parallel to the Y-axis about the Z-axis positive direction as the rotation axis, when the right-handed screw direction is defined as the positive direction. Hence, in the case where the Z-axis positive direction is defined as the upward direction, the focused image is the rotated image of the inverted image which is rotated by +A° about the light propagation direction as the axis when the right-handed screw direction is defined as the positive direction.

Here, from a different perspective where the relationship between the intensity distribution of light on the light emitting surface 31 and the image is inversed, it is emphasized that the emission intensity distribution image on the light emitting surface 31 (emitted light $L_O$) is the rotated image of the image on the second mirror 521 which is rotated by $-A°$ when the right-handed screw direction is defined as the positive direction (this property will be used in description about the fifth mirror 513).

The image reflected by the second mirror 521 is once again focused by the third mirror 512 onto the fourth mirror 522 as an inverted image. In other words, when the Z-axis positive direction is defined as the upward direction, the image focused onto the fourth mirror 522 is the rotated image of the image focused onto the second mirror 521 which is rotated by $A+180°$ about the light propagation direction as the axis when the right-handed screw direction is defined as the positive direction.

The light reflected from the fourth mirror 522 is focused by the elliptical mirror of the fifth mirror 513 onto the light receiving surface 41 disposed at the focal point. The long side of the ellipse of the fifth mirror 513 is inclined at an inclination of $-B$ about the Z-axis positive direction as the rotation axis relative to one side of the rectangular light emitting surface 31 parallel to the Y-axis, when the right-handed screw direction is defined as the positive direction. The relationship of the light propagation direction relative to the reflective surface of the fifth mirror 513 is opposite to the relationship between the reflective surface of the first mirror 511 and the light propagation direction. Thus, the light incident on the light receiving surface 41 is the rotated image of the inverted image which is rotated by $180°+A°+B°$ about the light propagation direction as the axis, with respect to the positive direction of the intensity distribution of the light on the light emitting surface 31, when the right-handed screw direction is defined as the positive direction.

Figure 6:
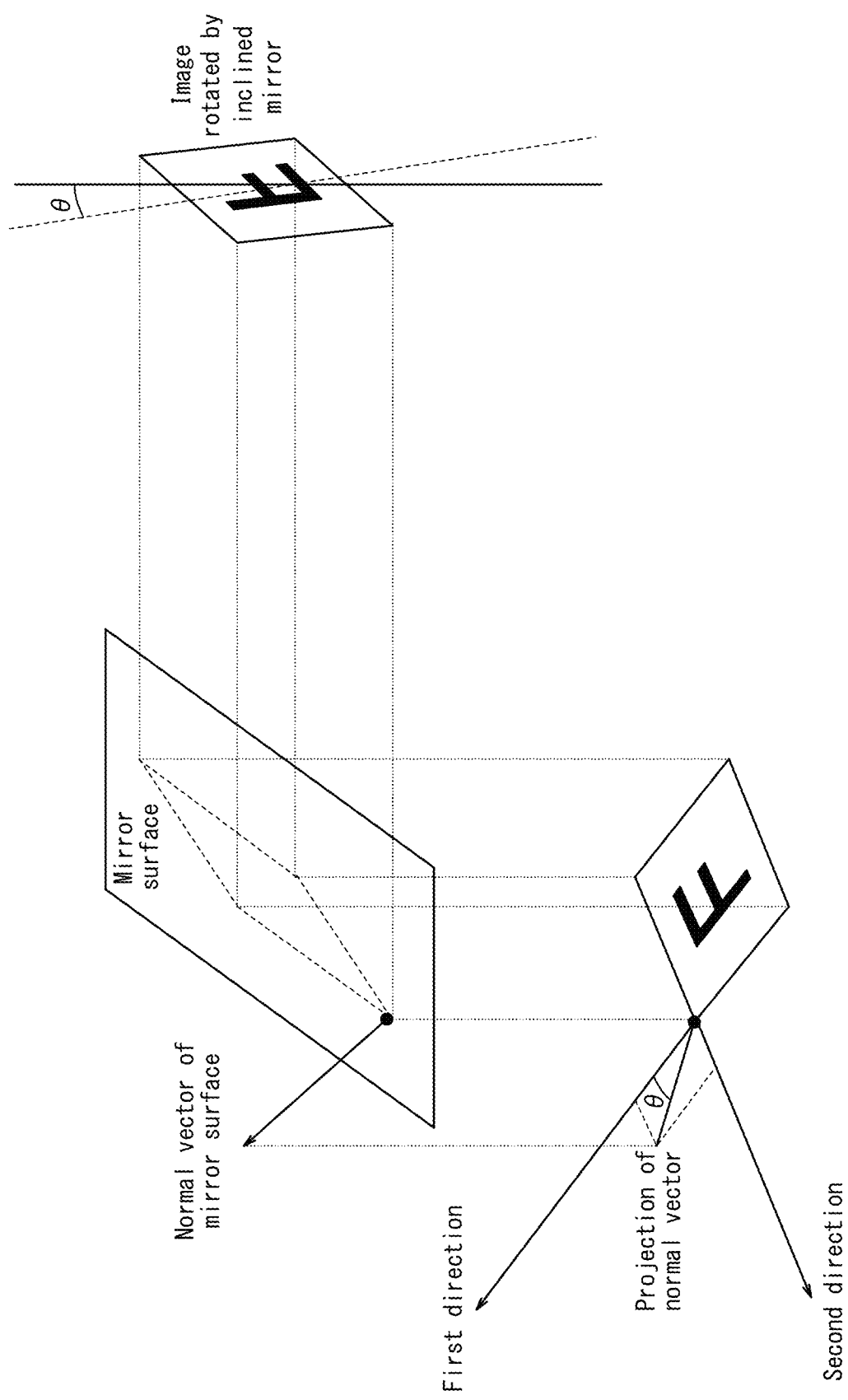
FIG. 6 is a diagram for explaining a rotated image.

FIG. 6 is a diagram for explaining a rotated image. As illustrated in FIG. 6, in the light guide member 5, in the case where the concave mirror or the plane mirror facing the light emitting surface 31 is inclined to the second direction, an image is rotated relative to the upward positive direction. Here, the first direction is a certain direction of the image on the light emitting surface 31 (emitted light $L_O$) (for example, when the light emitting surface 31 is shaped to be rectangular, the certain direction is the direction of a certain side). The second direction is a direction perpendicular to the first direction in the light emitting surface 31 and defining the right-handed system. In the case where the mirror facing the light receiving surface 41 is inclined in the similar manner in the light receiving surface 41, the light guide member 5 rotates the image of light. As used herein, the expression "inclined to the second direction" means that the vector in the direction of the rotational symmetry axis of the concave mirror (in a special case of a planar mirror, the vector is identical to the normal direction vector because a local rotation axis is present at any location) is not perpendicular to the second direction, that is, the unit vector in the second direction and the inner product are not zero, and has a projection component in the second direction. In other words, when the light emitting surface 31 and the light receiving surface 41 are rectangular, an image (incident light $L_1$) is rotated in the gas detection apparatus 1 having the light guide member 5 composed of mirror surfaces (or mirror surfaces of an off-axis optical system) having inclinations relative to the direction perpendicular to the direction of one side of the light emitting surface 31 or the light receiving surface 41 in that plane.

Hence, even if the light emitting element 3 is rotated, the orientation of the incident light $L_1$ will not match the orientation of the emitted light $L_O$. Accordingly, in plan view of the main surface 20 of the substrate 2, the disposition of the light receiving element 4 of the gas detection apparatus 1 according to the present embodiment can be described as follows based on the disposition of the light emitting element 3. The sides 32a, 32b, 32c, and 32d of the light emitting surface 31 of the light emitting element 3 after being subjected to a magnification or reduction and a translation do not overlap the sides 42a, 42b, 42c, and 42d of the light receiving surface 41 of the light receiving element 4. In other words, the sides 32a, 32b, 32c, and 32d of the light emitting surface 31 of the light emitting element 3 are parallel to neither sides of the light receiving surface 41 of the light receiving element 4. The sides 32a, 32b, 32c, and 32d of the light emitting surface 31 of the light emitting element 3 after being subjected to a magnification or reduction, a translation, and a rotational displacement overlap the sides 42a, 42b, 42c, and 42d of the light receiving surface 41 of the light receiving element 4. In other words, the sides 32a, 32b, 32c, and 32d of the light emitting surface 31 of the light emitting element 3 after being subjected to a rotational displacement are parallel to either side of the light receiving surface 41 of the light receiving element 4.

As described above, the incident light $L_1$ may be rotated in the light guide member 5 including mirror surfaces of an off-axis optical system. Even in such a case, the positional relationship between the light emitting element 3 and the light receiving element 4 prevents the margin $m_O$ from being narrowed by the rotation of the incident light $L_1$ in the light guide member 5 to thereby achieve stable and highly accurate gas detections. In off-axis optical and free-form surface optical systems, the minimum margin $m_O$ of the light receiving region at the light receiving surface 41 is prevented from being narrowed by optical aberration. Accordingly, the light guide member 5 is preferably an off-axis optical system or a free-form surface optical system. As used herein, the term "off-axis optical system" refers to an optical system in which lenses, mirror surfaces, or a lens and a mirror that do not include mirror surfaces positioned at the rotation center axis are used in a lens, a spherical mirror, an elliptical mirror, or the like. On the other hand, an optical system including mirror surfaces positioned at the rotation center axis is referred to as a "coaxial optical system" or a "symmetrical optical system". FIG. 11 is a diagram comparing light receiving surfaces 41 and incident light images when an off-axis optical system and a coaxial optical system in the same magnification are used as the light guide members 5. When the total amount of an incident light image incident on the light receiving surface 41 is taken as 100%, the region of the incident light image in which the amount of light becomes 99% when the off-axis optical system is used as the light guide member 5 is indicated by the label "SOA", and the region of the incident light image in which the amount of light becomes 99% when the coaxial optical system is used as the light guide member 5 is indicated by the label "SA". In these cases, the area of the region SA is 2.3 times the area of the region SOA. The observed effect of optical aberration where the coaxial optical system is used is greater than the effect of optical aberration where the off-axis optical system is used. From the above result, an off-axis optical system is desirably used for the light guide member 5 for achieving a small, stable, and highly accurate gas detection.

As described above, the above configuration of the gas detection apparatus 1 according to the present embodiment can achieve stable and highly accurate gas detections.

Although the embodiments have been described with reference to the drawings and the examples, it should be noted that various modifications and variations can be readily conceived of by a person skilled in the art based on the present disclosure. It should be understood that such modifications and variations are encompassed within the scope of the present disclosure. For example, the members, the functions included in each means, or the like can be rearranged unless they are logically contradicted, and a plurality of means, and the like can be combined into one or means can be divided, for example.

Figure 7:
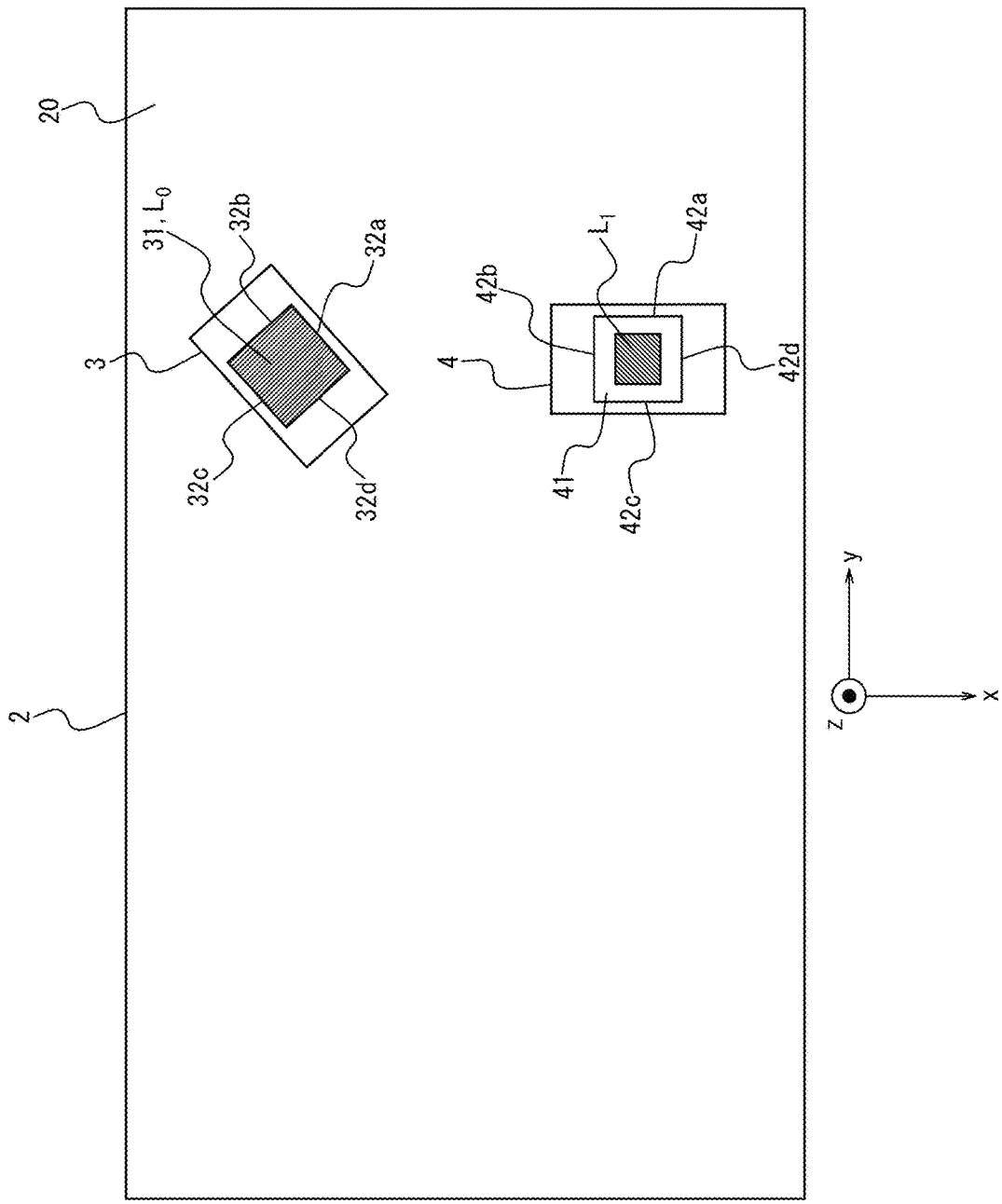
FIG. 7 illustrates another example of the dispositions of the light emitting element and the light receiving element.
Figure 8:
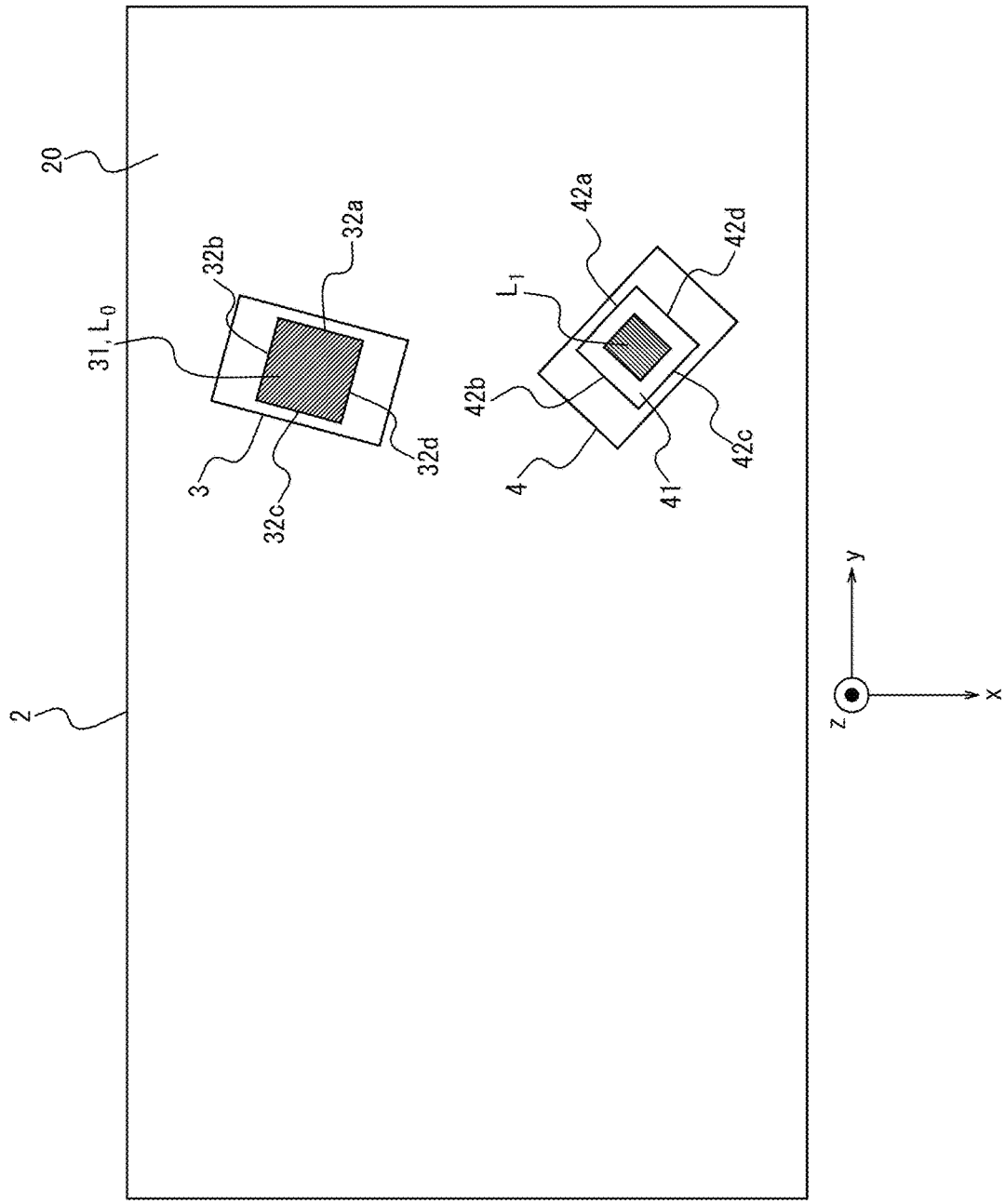
FIG. 8 illustrates another example of the dispositions of the light emitting element and the light receiving element.

For example, in the above embodiment, the light emitting element 3 is disposed so that the sides 32a, 32b, 32c, and 32d of the light emitting surface 31 are parallel to the x-axis or the y-axis. In one modification, as illustrated in FIG. 7, the light receiving element 4 may be disposed so that the sides 42a, 42b, 42c, and 42d of the light receiving surface 41 are parallel to the x-axis or the y-axis. In this case, the light emitting element 3 is disposes so that the sides 32a, 32b, 32c, and 32d of the light emitting surface 31 are parallel to neither the x-axis nor the y-axis. As a result, the sides of the incident light $L_1$ become parallel to the x-axis or the y-axis. In another modification, as illustrated in FIG. 8, the light emitting element 3 and the light receiving element 4 may be disposed so that the sides 32a, 32b, 32c, and 32d of the light emitting surface 31 and the sides 42a, 42b, 42c, and 42d of the light receiving surface 41 are parallel to neither the x-axis nor the y-axis.

The invention claimed is:

1. A gas detection apparatus comprising:
   a light emitting element provided on a main surface of the substrate for emitting light from a light emitting surface;
   a light receiving element provided on the main surface of the substrate for receiving the light on a light receiving surface; and
   a light guide member for guiding the light emitted by the light emitting element to the light receiving element,
   in plan view of the main surface of the substrate,
      the light emitting surface and the light receiving surface being shaped to have corners, and
      sides of the light emitting surface being parallel to neither sides of the light receiving surface.

2. The gas detection apparatus according to claim 1, wherein the light emitting element is a surface light source.

3. The gas detection apparatus according to claim 1, wherein when a direction of one side of the light emitting surface or the light receiving surface is defined as a first direction and a direction perpendicular to the first direction in a plane thereof is defined as a second direction, the light guide member is composed of a mirror surface, and a unit vector in a direction of a rotation symmetrical axis of the mirror surface has projection components in both the first direction and the second direction.

4. The gas detection apparatus according to claim 1, wherein the light guide member is an off-axis optical system.

5. The gas detection apparatus according to claim 1, wherein the light guide member is a free-form surface optical system.

6. The gas detection apparatus according to claim 1, wherein
   the light guide member comprises:
      a first reflecting portion for directly reflecting the light emitted by the light emitting element and the light to be received by the light receiving element, and
      a second reflecting portion for reflecting the light to and from the first reflecting portion, a relative position of the second reflecting portion to the first reflection portion being fixed.

7. A gas detection apparatus comprising:
   a substrate having a rectangular main surface;
   a light emitting element provided on a main surface of the substrate for emitting light from a rectangular light emitting surface;
   a light receiving element provided on the main surface of the substrate for receiving the light on a rectangular light receiving surface; and
   a light guide member for guiding the light emitted by the light emitting element to the light receiving element,
   sides of the light receiving surface or the light emitting surface being parallel to neither sides of the main surface of the substrate in plan view of the main surface of the substrate.

8. The gas detection apparatus according to claim 7, wherein the light emitting element is a surface light source.

9. The gas detection apparatus according to claim 7, wherein when a direction of one side of the light emitting surface or the light receiving surface is defined as a first direction and a direction perpendicular to the first direction in a plane thereof is defined as a second direction, the light guide member is composed of a mirror surface, and a unit vector in a direction of a rotation symmetrical axis of the mirror surface has projection components in both the first direction and the second direction.

10. The gas detection apparatus according to claim 7, wherein the light guide member is an off-axis optical system.

11. The gas detection apparatus according to claim 7, wherein the light guide member is a free-form surface optical system.

12. The gas detection apparatus according to claim 7, wherein
   the light guide member comprises:
      a first reflecting portion for directly reflecting the light emitted by the light emitting element and the light to be received by the light receiving element, and
      a second reflecting portion for reflecting the light to and from the first reflecting portion, a relative position of the second reflecting portion to the first reflection portion being fixed.

\* \* \* \* \*